US009189063B2

(12) United States Patent
Lee et al.

(10) Patent No.: US 9,189,063 B2
(45) Date of Patent: Nov. 17, 2015

(54) COORDINATE TRANSFORMATION METHOD AND COMPUTER SYSTEM FOR INTERACTIVE SYSTEM

(71) Applicant: Wistron Corporation, New Taipei (TW)

(72) Inventors: Chih-Hsuan Lee, New Taipei (TW); Shou-Te Wei, New Taipei (TW); Chia-Te Chou, New Taipei (TW)

(73) Assignee: Wistron Corporation, Hsichih, New Taipei (TW)

( * ) Notice: Subject to any disclaimer, the term of this patent is extended or adjusted under 35 U.S.C. 154(b) by 123 days.

(21) Appl. No.: 14/047,036

(22) Filed: Oct. 7, 2013

(65) Prior Publication Data

US 2014/0184569 A1 Jul. 3, 2014

(30) Foreign Application Priority Data

Dec. 28, 2012 (TW) .............................. 101151014 A

(51) Int. Cl.
  *G06F 3/01* (2006.01)
  *G06F 3/042* (2006.01)
  *G06K 9/00* (2006.01)

(52) U.S. Cl.
  CPC ................ *G06F 3/012* (2013.01); *G06F 3/017* (2013.01); *G06F 3/042* (2013.01); *G06K 9/00228* (2013.01); *G06K 9/00382* (2013.01)

(58) Field of Classification Search
  CPC ......... G06F 3/017; G06F 3/033; G06F 3/042; G06K 9/0035; G06K 9/00261
  USPC ......................................... 345/156, 157, 175
  See application file for complete search history.

(56) References Cited

U.S. PATENT DOCUMENTS

| | | | | |
|---|---|---|---|---|
| 5,633,995 | A | * | 5/1997 | McClain ...................... 345/419 |
| 8,408,706 | B2 | * | 4/2013 | Yahav ........................... 351/210 |
| 8,564,693 | B2 | * | 10/2013 | Makii ........................... 348/239 |
| 8,740,702 | B2 | * | 6/2014 | Langridge et al. ............. 463/36 |

(Continued)

FOREIGN PATENT DOCUMENTS

| | | |
|---|---|---|
| TW | 201237691 | 9/2012 |
| TW | 201250609 | 12/2012 |
| WO | 2012061493 A2 | 5/2012 |

OTHER PUBLICATIONS

Office action mailed on Oct. 30, 2014 for the Taiwan application No. 101151014, filing date: Dec. 28, 2012, p. 2 line 5~26, p. 3~7 and p. 8 line 1~11.

*Primary Examiner* — Ricardo L Osorio
(74) *Attorney, Agent, or Firm* — Winston Hsu; Scott Margo

(57) ABSTRACT

A coordinate transformation method for a user and an interactive system including a detection module is disclosed. The coordinate transformation method includes determining a face information and a command object of the user via the detection module to obtain a face coordinate and a command object coordinate, transforming the face coordinate into a transformed face coordinate according to a coordinate of the detection module, obtaining an angle between an optical-axis ray and a line formed via connecting the transformed face coordinate and the coordinate of the detection module, obtaining a transformed command object coordinate according to the angle and the command object coordinate, and determining a depth change of the command object according to the transformed object coordinate to set up an interactive operation between the interactive system and the user.

16 Claims, 7 Drawing Sheets

(56) References Cited

U.S. PATENT DOCUMENTS

| | | | |
|---|---|---|---|
| 8,873,813 B2* | 10/2014 | Tadayon et al. | 382/118 |
| 8,956,227 B2* | 2/2015 | Suzuki et al. | 463/33 |
| 2007/0104353 A1* | 5/2007 | Vogel | 382/106 |
| 2008/0166017 A1* | 7/2008 | Ito et al. | 382/103 |
| 2010/0302145 A1* | 12/2010 | Langridge et al. | 345/157 |
| 2012/0218395 A1 | 8/2012 | Andersen | |
| 2012/0249527 A1* | 10/2012 | Noda | 345/419 |
| 2014/0037134 A1 | 2/2014 | Tong | |

\* cited by examiner

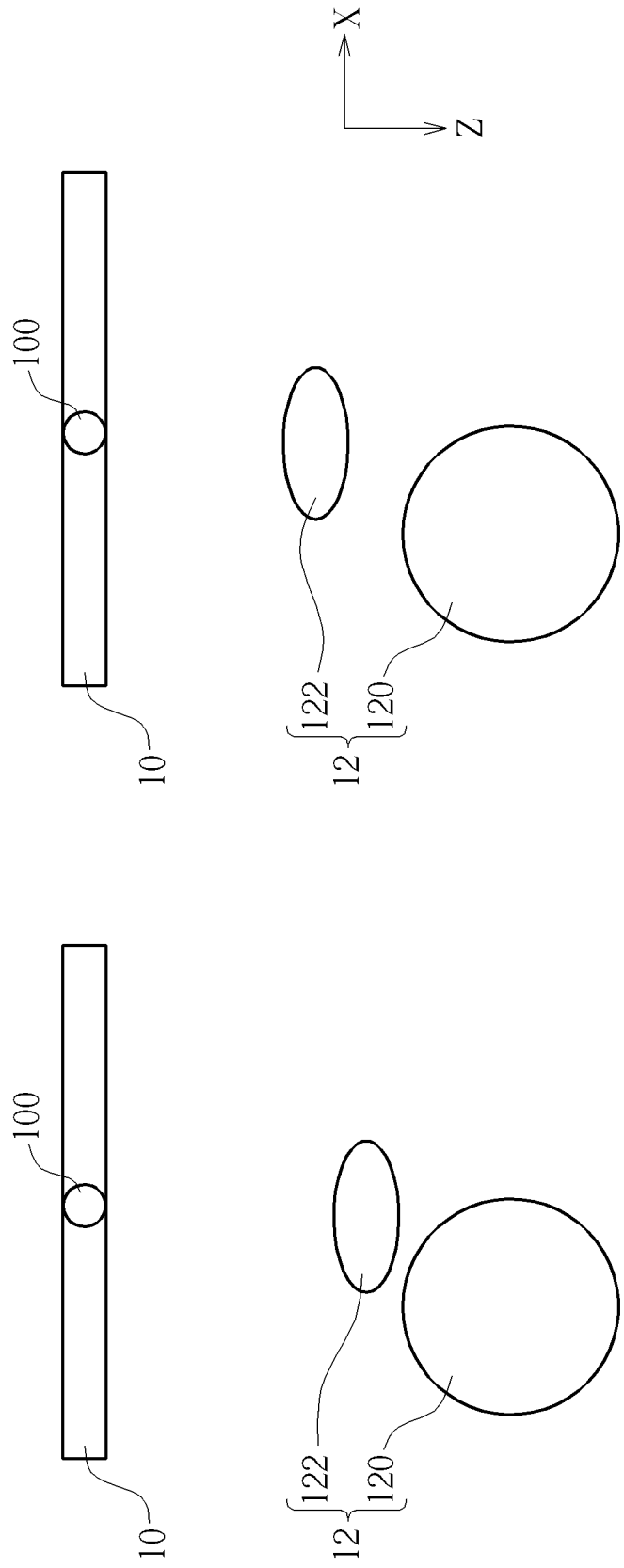

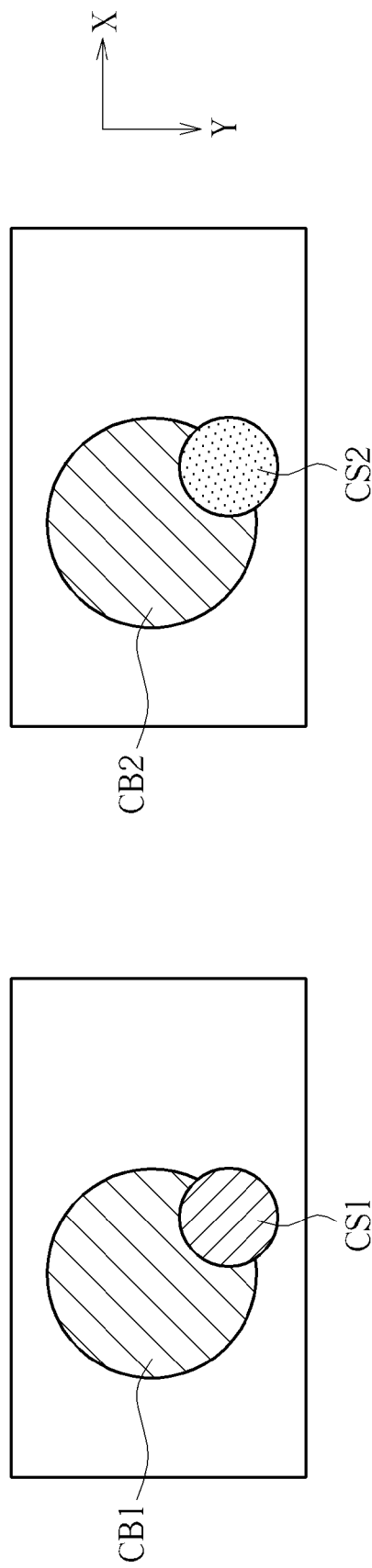

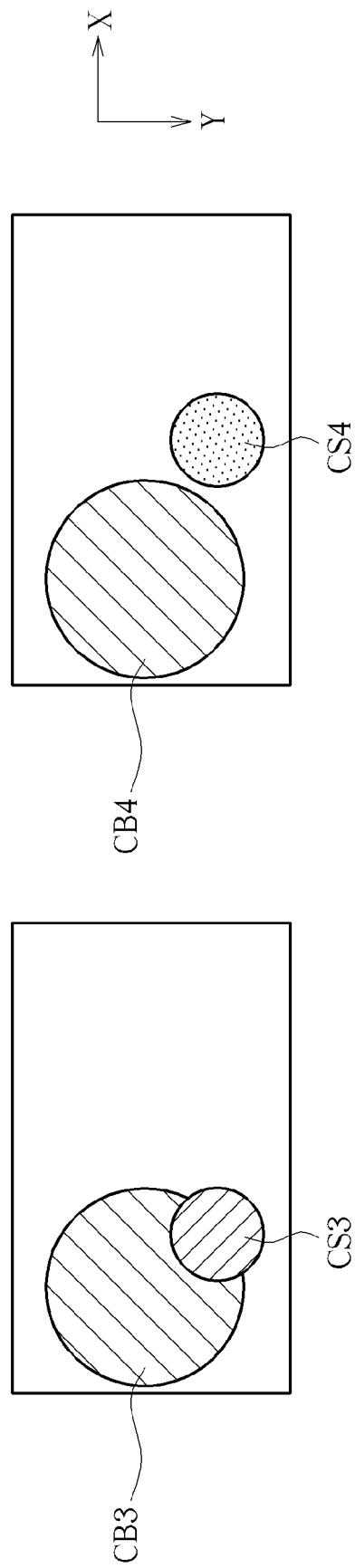

COORDINATE TRANSFORMATION METHOD AND COMPUTER SYSTEM FOR INTERACTIVE SYSTEM

BACKGROUND OF THE INVENTION

1. Field of the Invention

The present invention relates to a coordinate transformation method and a computer system for an interactive system, and more particularly, to a coordinate transformation method and a computer system for an interactive system which determine a depth change of a command object according to a face coordinate and a coordinate of a detection module.

2. Description of the Prior Art

In the prior art, users can utilize a wireless/wired transmission control module, such as a keyboard or a mouse, to control an electronic device. However, as imaging processing advances, the electronic device can utilize a specific detection module to detect a body movement of the user, such as an arm of the user moving up and down, so as to determine an operation command of the user.

Please refer to FIG. 1A and FIG. 1B, which illustrate schematic diagrams of a conventional interactive system 10 determining the operation command of the user. As shown in FIG. 1A and FIG. 1B, the interactive system 10 comprises a detection module 100 and a user 12 that approximately stands in front of the detection module 100 of the interactive system 10. Also, a head 120 and a hand 122 of the user 12 is simply depicted in FIG. 1A and FIG. 1B, and the interactive system 10 predetermines a plurality of predetermined operation commands, wherein each of the plurality of predetermined operation commands corresponds to a movement change of the hand 122. Under such circumstances, the detection module 100 is utilized to detect the movement change of the hand 122 to determine the operation commands of the user 12. Please refer to FIG. 2A and FIG. 2B, which illustrate schematic diagrams of detection results corresponding to FIG. 1A and FIG. 1B, respectively, via the detection module 100, wherein a big circle represents an image of the head 120 and a small circle represents an image of the hand 122. As shown in FIG. 1A to FIG. 2B, considering the user 12 locating in front of the detection module 100, when the user 12 forward moves the hand 122 from a position shown in FIG. 1A to another position shown in FIG. 1B, the detection module 100 correspondingly has the detection results as images CB1, CB2 representing the head 120 and images CS1, CS2 representing the hand 122. Preferably, positions of the images CB1, CB2 related to positions of the images CS1, CS2 do not have any position changes on the XY plane, but positions of the images CS1, CS2 representing the hand 122 change along the Z-axis to be depth changes. Under such circumstances, the user can precisely instruct the interactive system 10 with the operation commands according to the depth changes of the hand 122 along the Z-axis.

Please refer to FIG. 3A and FIG. 3B, which illustrate schematic diagrams of the conventional interactive system 10, as shown in FIG. 1A and FIG. 1B, determining the operation command of the user. In comparison with the embodiments shown in FIG. 1A and FIG. 1B, the user 12 in FIG. 3A and FIG. 3B does not directly face the detection module 100, but obliquely stands in front of the detection module 100. Please refer to FIG. 4A and FIG. 4B, which illustrate schematic diagrams of detection results corresponding to FIG. 3A and FIG. 3B, respectively, via the detection module 100. Similarly, the big circle represents the image of the head 120 and the small circle represents the image of the hand 122. As shown in FIG. 3A to FIG. 4B, since the user 12 does not directly stand right in front of the detection module 100, positions of the images CB3, CB4 representing the head 120 does not change while the user moves the hand 122 from a position shown in FIG. 3A to another position shown in FIG. 3B. However, positions of the images CS3, CS4 representing the hand 122 have position changes on the XY plane as well as along the Z-axis. Under such circumstances, the depth change of the hand 122 may fail to correspond to the predetermined operation commands in the interactive system 10 as the user originally expected, such that the interactive system 10 will not be precisely controlled via such incorrect predetermined operation commands.

Thus, it is important to provide a coordinate transformation method and a computer system for an interactive system which can adaptively determine a depth change of a command object to generate the correct predetermined operation commands.

SUMMARY OF THE INVENTION

It is therefore an objective of the invention to provide a coordinate transformation method and a computer system for an interactive system which determine a depth change of a command object according to a face coordinate and a coordinate of a detection module.

An embodiment of the invention discloses a coordinate transformation method for a user and an interactive system comprising a detection module. The coordinate transformation method comprises determining a face information and a command object of the user via the detection module to obtain a face coordinate and a command object coordinate, transforming the face coordinate into a transformed face coordinate according to a coordinate of the detection module, obtaining an angle between an optical-axis ray and a line formed via connecting the transformed face coordinate and the coordinate of the detection module, obtaining a transformed command object coordinate according to the angle and the command object coordinate, and determining a depth change of the command object according to the transformed command object coordinate to set up an interactive operation between the interactive system and the user.

An embodiment of the invention also discloses another computer system coupled to an interactive system comprising a detection module. The computer system comprises a central processing unit, a storage device coupled to the central processing unit for storing a programming code, the programming code being utilized to instruct the central processing unit to process a coordinate transformation method for a user and the interactive system. The coordinate transformation method comprises determining a face information and a command object of the user via the detection module to obtain a face coordinate and a command object coordinate, transforming the face coordinate into a transformed face coordinate according to a coordinate of the detection module, obtaining an angle between an optical-axis ray and a line formed via connecting the transformed face coordinate and the coordinate of the detection module, obtaining a transformed command object coordinate according to the angle and the command object coordinate, and determining a depth change of the command object according to the transformed command object coordinate to set up an interactive operation between the interactive system and the user.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 1A and FIG. 1B illustrate schematic diagrams of a conventional interactive system determining the operation command of the user.

FIG. 2A and FIG. 2B illustrate schematic diagrams of detection results corresponding to FIG. 1A and FIG. 1B, respectively, via a detection module.

FIG. 4A and FIG. 4B illustrate schematic diagrams of detection results corresponding to FIG. 3A and FIG. 3B, respectively, via a detection module.

DETAILED DESCRIPTION

The specification and the claim of the present invention may use a particular word to indicate an element, which may have diversified names named by distinct manufacturers. The present invention distinguishes the element depending on its function rather than its name. The phrase "comprising" used in the specification and the claim is to mean "is inclusive or open-ended but not exclude additional, un-recited elements or method steps." In addition, the phrase "electrically connected to" or "coupled" is to mean any electrical connection in a direct manner or an indirect manner. Therefore, the description of "a first device electrically connected or coupled to a second device" is to mean that the first device is connected to the second device directly or by means of connecting through other devices or methods in an indirect manner.

Figures 3A, 3B:
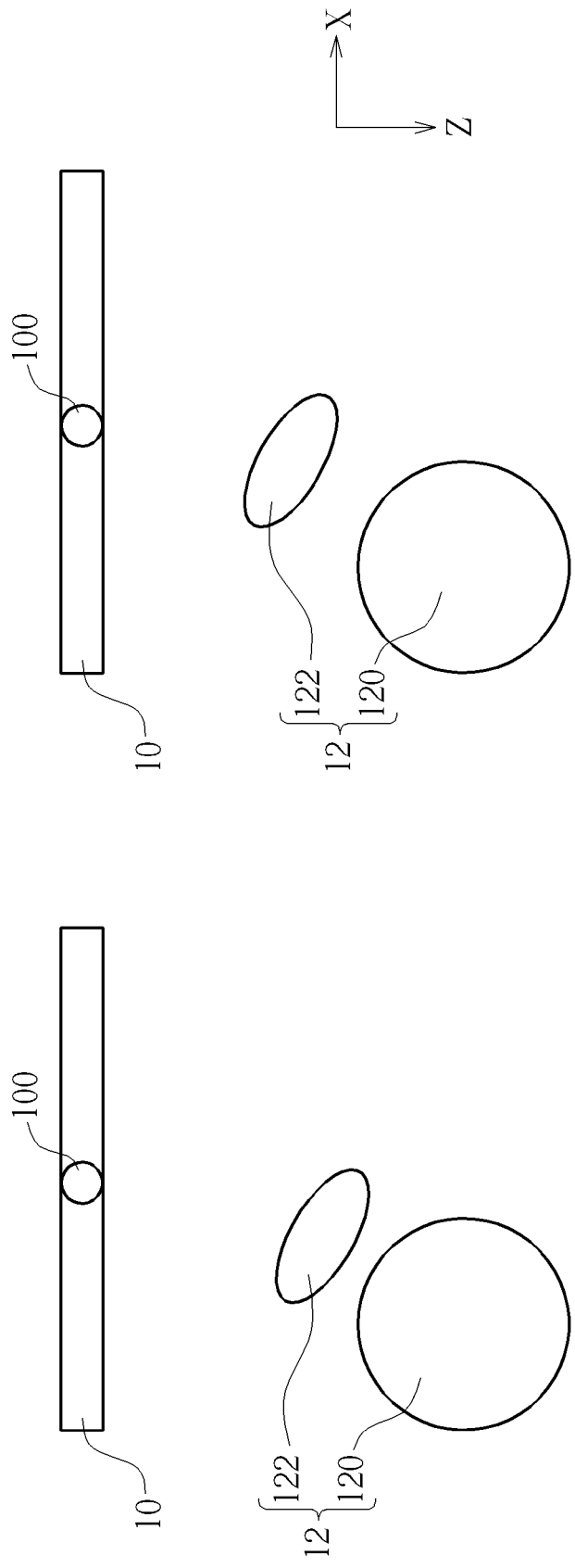
FIG. 3A and FIG. 3B illustrate schematic diagrams of the conventional interactive system, as shown in FIG. 1A and FIG. 1B, determining the operation command of the user.
Figure 5:
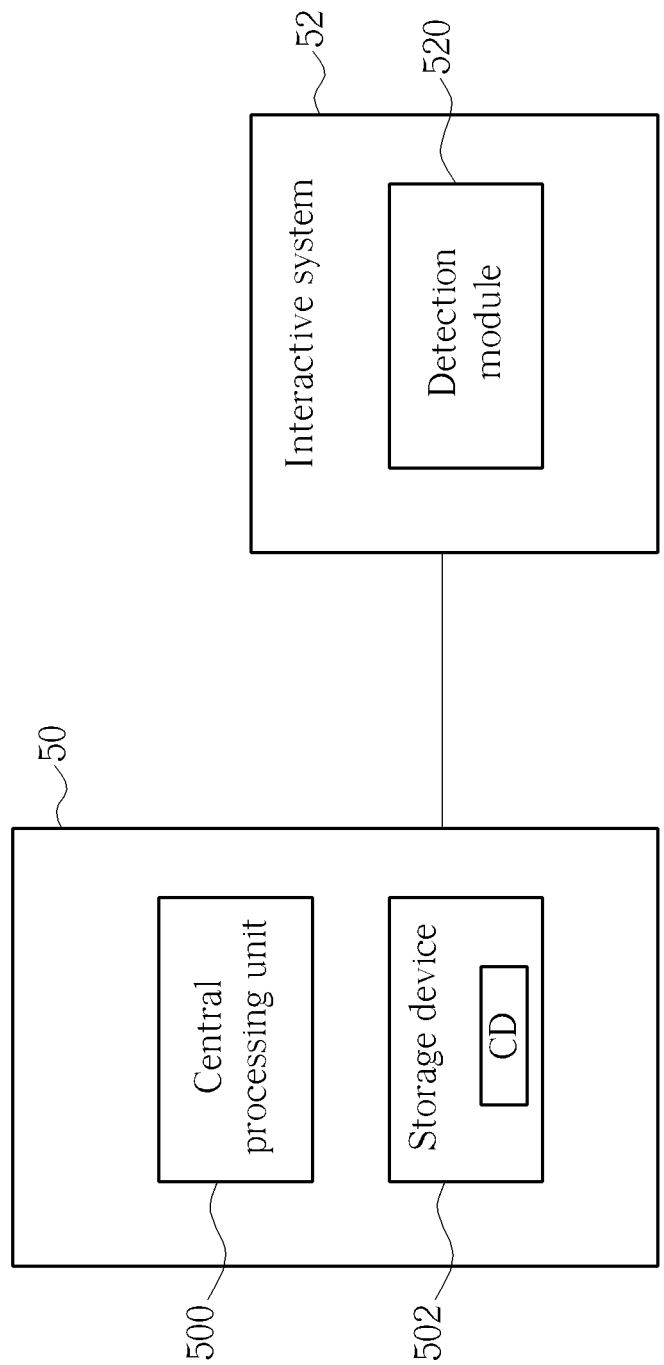
FIG. 5 illustrates a schematic diagram of a computer system according to an embodiment of the invention.

Please refer to FIG. 5, which illustrates a schematic diagram of a computer system 50 according to an embodiment of the invention. The computer system 50 is coupled to an interactive system 52, and comprises a central processing unit 500 and a storage device 502. The storage device 502 stores a programming code CD and a plurality of predetermined operation commands corresponding to a plurality of depth changes, and the programming code CD is utilized for instructing a coordinate transformation method for the interactive system 52 and a user (not shown in the figure). The interactive system 52 comprises a detection module 520. In the embodiment, the detection module 520 comprises a two-dimensional detection unit or a three-dimensional detection unit, or comprises both of the two-dimensional detection unit and the three-dimensional detection unit, such that the detection module 520 is utilized to retrieve a two-dimensional detection image and/or a three-dimensional detection image. The two-dimensional detection unit and the three-dimensional detection unit comprise at least an optical camera and a camera focus length thereof to retrieve related images. The computer system 50 and the interactive system 52 utilize a wired/wireless communication way to process signal communication, such that the computer system 50 can adaptively control the interactive system 52 and the detection module 520, and the interactive system 52 can correspondingly transmit the retrieved two-dimensional detection image and/or the retrieved three-dimensional detection image to the computer system 50, which is not intended to limit the scope of the invention.

Preferably, in the embodiment, the detection module 520 predetermines a universal coordinate system, comprising a universal origin, and an optical-axis ray, which represents that a light does not have the aberration effect if passing through the optical-axis ray. The two-dimensional detection image and/or the three-dimensional detection image is/are processed in the computer system 50, where the central processing units 500 processes a calculating simulation concerning the universal coordinate system, to determine coordinates of different positions corresponding to the universal origin in the two-dimensional detection image and/or the three-dimensional detection image, and the calculating simulation is compiled as the programming code CD to be stored in the storage device 502. Certainly, those skilled in the art can also utilize another processing unit (not shown in the figure) of the interactive system 52 to process the related coordinates of different positions corresponding to the universal origin in the two-dimensional detection image and/or the three-dimensional detection image, and accordingly, the calculated coordinates are transmitted to the computer system 50 for following operations, which is also in the scope of the invention. Furthermore, the embodiment of the invention does not limit a disposition way of the detection module 520 and the interactive system 52, and the concept is granted as similar to the one of the invention once the detection module 520 can adaptively determine whether the user is approaching the interactive system 52 to allow the user to utilize body movement for controlling the interactive system 52.

Figure 6:
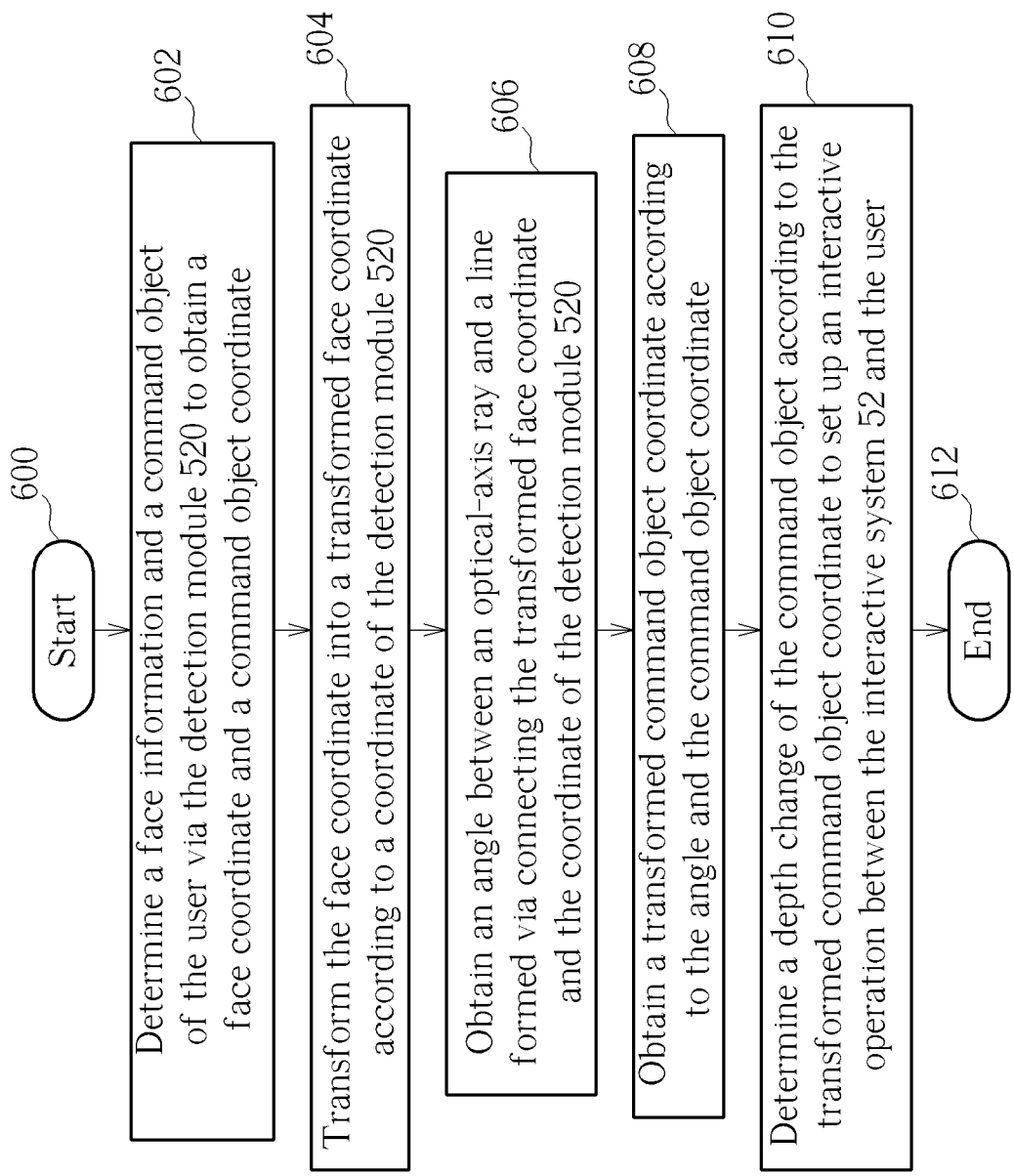
FIG. 6 illustrates a flow chart of a coordinate transformation process according to an embodiment of the invention.

Further, the embodiment of the invention provides a coordinate transformation method for the computer system 50 to control the interactive system 52, and the coordinate transformation method can be summarized as a coordinate transformation process 60 to be compiled as the programming code CD, as shown in FIG. 6. The coordinate transformation process 60 includes the following steps.

Step 600: Start.

Step 602: Determine a face information and a command object of the user via the detection module 520 to obtain a face coordinate and a command object coordinate.

Step 604: Transform the face coordinate into a transformed face coordinate according to a coordinate of the detection module 520.

Step 606: Obtain an angle between an optical-axis ray and a line formed via connecting the transformed face coordinate and the coordinate of the detection module 520.

Step 608: Obtain a transformed command object coordinate according to the angle and the command object coordinate.

Step 610: Determine a depth change of the command object according to the transformed command object coordinate to set up an interactive operation between the interactive system 52 and the user.

Step 612: End.

In step 602, the interactive system 52 utilizes the detection module 520 to determine the face information and the command object of the user, so as to obtain the face coordinate and the command object coordinate. Preferably, the detection module 520 cooperates with a face tracking technique for associated operations. First, the detection module 520 detects whether a face image of the user exists within an available detection range of the detection module 520. If the face image does exist within the available detection range of the detection module 520, a two-dimensional (or three-dimensional)

image of the face image is retrieved via the detection module 520, and the mentioned universal coordinate as well as the related calculating simulation are utilized to generate the face coordinate via the computer system 50 (or the processing unit of the interactive system). In the meanwhile, after obtaining the two-dimensional (or three-dimensional) image of the face image, the detection module 520 further determines whether a closest command object neighboring to the detection module 520 exists, and specifically, an image of the command object should be smaller than a size of the face image in the two-dimensional (or three-dimensional) image. If the command object neighboring to the detection module 520 exists, the detection module 520 determines the command object to be a hand image of the user, such as a finger or a palm, and the mentioned universal coordinate as well as the related calculating simulation are utilized to generate a hand coordinate (i.e. a command object coordinate) via the computer system 50 (or the processing unit of the interactive system 52).

Noticeably, since neither the face information of the user nor the command object is a single point, the embodiment of the invention can adaptively select one or more coordinates related to one or more points of the face information as well as the command object in the two-dimensional (or three-dimensional) image, to be the representative coordinate(s) of the face information as well as the command object. Considering different precision requirements, those skilled in the art can average the plurality of representative coordinates of the face information as well as the command object in the two-dimensional (or three-dimensional) image, which is also in the scope of the invention.

In step 604, the computer system 50 can determine the coordinate of the detection module 520 in the universal coordinate system and the camera focus length of the detection module 520. Under such circumstances, the central processing unit 500 further utilizes a first matrix to process a rotational operation for the face coordinate, so as to transform the face coordinate into the transformed face coordinate, wherein the first matrix is obtained as $$\begin{bmatrix} f & 0 & 0 \\ 0 & f & 0 \\ 0 & 0 & 1 \end{bmatrix}$$

and the symbol f represents the camera focus length. In other words, the above rotational operation can be regarded as transforming the universal coordinate system into a corrected universal coordinate system, such that the detection module 520 is located right at a corrected universal origin of the corrected universal coordinate system, and accordingly, the transformed face coordinate is obtained via calculating a difference between the face coordinate as well as the corrected universal origin, wherein the corrected universal coordinate system comprises a corrected universal X-axis, a corrected universal Y-axis and a corrected universal Z-axis and the optical-axis ray overlaps onto the corrected universal Z-axis.

In step 606, the detection module 520 can be regarded as a single point, and accordingly, the central processing unit 500 connects the face coordinate and the coordinate of the detection module 520 to foam the line. Simultaneously considering a ray via extending the optical-axis ray, the angle between the line as well as the optical-axis ray is obtained accordingly. Preferably, the angle is obtained as an angle difference between the line as well as the corrected universal X-axis, the corrected universal Y-axis or the corrected universal Z-axis as $\omega$, $\phi$ or $\kappa$, respectively.

In step 608, the central processing unit 500 obtains the transformed command object coordinate according to the angle and the command object coordinate (i.e. the hand coordinate). Preferably, after processing step 604 and step 606, the transformed face coordinate is located on the corrected universal Z-axis of the corrected universal coordinate system, such that reference angles between the command object coordinate as well as the corrected universal X-axis, the corrected universal Y-axis or the corrected universal Z-axis are obtained to be $\omega$, $\phi$ or $\kappa$, respectively, referenced to the angle related to the optical-axis ray. Thus, the reference angles as $\omega$, $\phi$ and $\kappa$ can be utilized to form a second matrix, and another rotational operation is processed via the second matrix to obtain the transformed command object coordinate.

Figure 7:
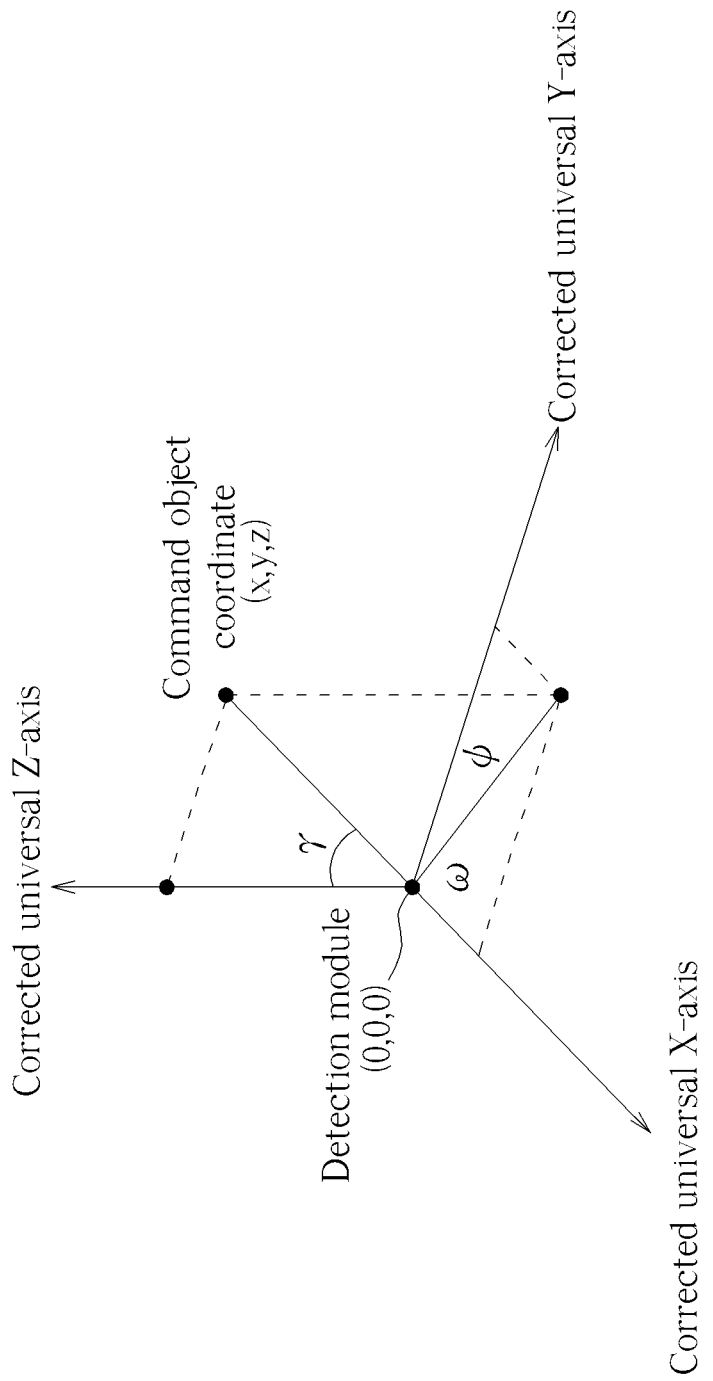
FIG. 7 illustrates a schematic diagram of a command object coordinate in the corrected universal coordinate system according to an embodiment of the invention.

Please refer to FIG. 7, which illustrates a schematic diagram of a command object coordinate as (X, Y, Z) in the corrected universal coordinate system according to an embodiment of the invention. As shown in FIG. 7, when the reference angle between the command object coordinate as well as the corrected universal X-axis is $\omega$, the second matrix is obtained as $$\begin{bmatrix} 1 & 0 & 0 \\ 0 & \cos\omega & \sin\omega \\ 0 & -\sin\omega & -\cos\omega \end{bmatrix};$$

when the reference angle between the command object coordinate as well as the corrected universal Y-axis is $\phi$, the second matrix is obtained as $$\begin{bmatrix} \cos\phi & 0 & -\sin\phi \\ 0 & 1 & 0 \\ \sin\phi & 0 & \cos\phi \end{bmatrix};$$

when the reference angle between the command object coordinate as well as the corrected universal Z-axis is $\kappa$, the second matrix is obtained as $$\begin{bmatrix} \cos\kappa & \sin\kappa & 0 \\ -\sin\kappa & \cos\kappa & 0 \\ 0 & 0 & 1 \end{bmatrix}.$$

Accordingly, the command object coordinate as (X, Y, Z) is sequentially processed the rotational operation corresponding to the corrected universal X-axis, the corrected universal Y-axis and the corrected universal Z-axis, which means a product is obtained via sequentially multiplying the command object coordinate as (X, Y, Z) by multiplication matrixes as $$\begin{bmatrix} 1 & 0 & 0 \\ 0 & \cos\omega & \sin\omega \\ 0 & -\sin\omega & -\cos\omega \end{bmatrix}, \begin{bmatrix} \cos\theta & 0 & -\sin\phi \\ 0 & 1 & 0 \\ \sin\phi & 0 & \cos\phi \end{bmatrix} \text{ and } \begin{bmatrix} \cos\kappa & \sin\kappa & 0 \\ -\sin\kappa & \cos\kappa & 0 \\ 0 & 0 & 1 \end{bmatrix}$$

to obtain the transformed command object coordinate being located on the corrected universal Z-axis. Noticeably, the embodiment of the invention does not limit priorities of the matrix multiplication calculation for the multiplication matrixes corresponding to the reference angle as ω, ϕ or κ, which means that the commutative property for the matrix multiplication is held. Besides, when one of the reference angles as ω, ϕ and κ is zero, the central processing unit 500 can neglect the corresponding rotational operation for the angle being zero. For example, when the reference angle of ϕ is zero, which means the detection module 520 and the user share the same height, the rotational operation utilizing the multiplication matrix as $$\begin{bmatrix} \cos\phi & 0 & -\sin\phi \\ 0 & 1 & 0 \\ \sin\phi & 0 & \cos\phi \end{bmatrix}$$

can be neglected. Under such circumstances, after processing step 608, the transformed command object coordinate is located right on the corrected universal Z-axis, such that the central processing unit 500 can easily obtain a Z-axis coordinate of the transformed command object coordinate (i.e. obtaining a depth value corresponding to the detection module 520).

Lastly, in step 610, the central processing unit 500 records a plurality of depth values of the transformed command object coordinate at a plurality of periods, such as obtaining a first transformed command object depth value at a first period, and obtaining a second transformed command object depth value at a second period after passing a predetermined period. Under such circumstances, the central processing unit 500 calculates a depth change between the first transformed command object depth value and the second transformed command object depth value, and accordingly, determines an operation command corresponding to the depth change from one of the plurality of predetermined operation commands, such that the correct operation command is generated to be transmitted to the interactive system 52, so as to precisely control the related operation for the interactive system 52. Preferably, the embodiment of the invention can also utilize the central processing unit 500 to transmit the plurality of depth changes to the interactive system 52, and another storage unit, which predetermines the plurality of operation commands corresponding to the plurality of depth changes, and the processing unit of the interactive system 52 can cooperate to determine the correct operation command for the user, which is also in the scope of the invention.

Simply, the embodiment of the invention obtains a plurality of Z-axis coordinate distances of the command object corresponding to the detection module 520 at the plurality of periods, such that the central processing unit 500 (or the processing unit of the interactive system 52) can correctly determine the plurality of Z-axis coordinate distances for outputting the proper operation command of the user. In comparison with the prior art, where the user is not right in front of the detection module 520 to result in position shifts of the command object on the XY plane and incorrect depth changes along the Z-axis, the embodiment of the invention has been adaptively corrected/modified to obtain the corrected universal coordinate system and the (reference) angles as ω, ϕ and κ related to the optical-axis ray, so as to correct the practical depth changes of the command object. Noticeably, the embodiment of the invention does not limit generation of the predetermined operation commands to be confined to utilization of the depth change along the Z-axis only for controlling the interactive system 52, and those skilled in the art can adaptively add/predetermine more coordinate changes along the X-axis, the Y-axis or on the XY plane corresponding to other predetermined operation commands, which is also in the scope of the invention.

Certainly, those skilled in the art can arbitrarily adjust an absolute value of the predetermined period, or can utilize a user interface of the computer system 50 to correspondingly modify/adjust the plurality of predetermined operation commands as well as the plurality of depth changes thereof stored in the storage device 502. Additionally, the detection module 520 of the invention further comprises another optical lens to increase the aberration effect of entering lights, and accordingly, the two-dimensional detection unit and/or the three-dimensional detection unit can cooperate with the optical lens to obtain a larger detection range of the detection module 520. For the interactive system 52 of the invention, a touch operation as well as a switching module/mechanism can also be utilized to adaptively switch different operational modes for complying with different requirements, i.e. the user can utilize the body movement as well as the touch operation to interact with the interactive system 52, which is also in the scope of the invention.

In summary, the embodiment of the invention provides a coordinate transformation method and a computer system thereof, which simultaneously consider a face coordinate as well as a coordinate of the detection module to determine a depth change of a command object, so as to generate a correct operation command for controlling operations of the interactive system. In comparison with the prior art, the embodiment of the invention has modified the situation where the command object (or the user) is not right in front of the detection module to result in erroneous determination for the Z-axis coordinate, and can adaptively install other determination mechanisms as the coordinate changes along the X-axis, the Y-axis or on the XY plane to enlarge the application range of the interactive system.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A coordinate transformation method for a user and an interactive system comprising a detection module, the coordinate transformation method comprising:
   determining a face information and a command object of the user via the detection module to obtain a face coordinate and a command object coordinate;
   transforming the face coordinate into a transformed face coordinate according to a coordinate of the detection module;
   obtaining an angle between an optical-axis ray and a line formed via connecting the transformed face coordinate and the coordinate of the detection module;
   obtaining a transformed command object coordinate according to the angle and the command object coordinate; and
   determining a depth change of the command object according to the transformed command object coordinate to set up an interactive operation between the interactive system and the user.

2. The coordinate transformation method of claim 1, wherein the detection module comprises a two-dimensional detection unit and a three-dimensional detection unit, and the detection module predetermines the optical-axis ray.

3. The coordinate transformation method of claim 1, wherein the command object is a closest object to the detection module and is realized as a finger or a palm of the user.

4. The coordinate transformation method of claim 1, wherein the step of transforming the face coordinate into the transformed face coordinate according to the coordinate of the detection module further comprises:
utilizing a first matrix to process a rotational operation for the face coordinate according to a camera focus length, to form the transformed face coordinate;
wherein the first matrix is realized as $$\begin{bmatrix} f & 0 & 0 \\ 0 & f & 0 \\ 0 & 0 & 1 \end{bmatrix}$$

and the symbol f is the camera focus length.

5. The coordinate transformation method of claim 1, wherein the step of obtaining the transformed command object coordinate according to the angle and the command object coordinate further comprises:
utilizing the coordinate of the detection module as a corrected universal origin to set up a corrected universal coordinate system comprising a corrected universal X-axis, a corrected universal Y-axis and a corrected universal Z-axis, so as to determine a reference angle between the angle as well as the corrected universal X-axis, the corrected universal Y-axis and the corrected universal Z-axis; and
obtaining the transformed command object coordinate according to the reference angle.

6. The coordinate transformation method of claim 5, wherein the step of obtaining the transformed command object coordinate according to the reference angle further comprises:
utilizing a second matrix to process a rotational operation for the command object coordinate to obtain the transformed command object coordinate;
wherein when the reference angle between the angle and the corrected universal X-axis is ω, the second matrix is realized as $$\begin{bmatrix} 1 & 0 & 0 \\ 0 & \cos\omega & \sin\omega \\ 0 & -\sin\omega & -\cos\omega \end{bmatrix};$$

when the reference angle between the angle and the corrected universal Y-axis is φ, the second matrix is realized as $$\begin{bmatrix} \cos\phi & 0 & -\sin\phi \\ 0 & 1 & 0 \\ \sin\phi & 0 & \cos\phi \end{bmatrix};$$

and when the reference angle between the angle and the corrected universal Z-axis is κ, the second matrix is realized as $$\begin{bmatrix} \cos\kappa & \sin\kappa & 0 \\ -\sin\kappa & \cos\kappa & 0 \\ 0 & 0 & 1 \end{bmatrix}.$$

7. The coordinate transformation method of claim 1, wherein the step of determining the depth change of the command object according to the transformed command object coordinate to set up the interactive operation between the interactive system and the user further comprises:
obtaining a plurality of transformed command object coordinates and a plurality of command object Z-axis coordinates thereof at a plurality of periods; and
calculating differences between two of the plurality of command object Z-axis coordinates to be the depth change, so as to set up the interactive operation between the interactive system and the user.

8. The coordinate transformation method of claim 1, wherein the interactive operation predetermines a plurality of command operations corresponding to different depth changes, such that the user operates the interactive system according to the depth change of the command object.

9. A computer system coupled to an interactive system comprising a detection module, the computer system comprising:
a central processing unit;
a non-transitory storage device coupled to the central processing unit for storing a programming code, the programming code being utilized to instruct the central processing unit to process a coordinate transformation method for a user and the interactive system, the coordinate transformation method comprising:
determining a face information and a command object of the user via the detection module to obtain a face coordinate and a command object coordinate;
transforming the face coordinate into a transformed face coordinate according to a coordinate of the detection module;
obtaining an angle between an optical-axis ray and a line formed via connecting the transformed face coordinate and the coordinate of the detection module;
obtaining a transformed command object coordinate according to the angle and the command object coordinate; and
determining a depth change of the command object according to the transformed command object coordinate to set up an interactive operation between the interactive system and the user.

10. The computer system of claim 9, wherein the detection module comprises a two-dimensional detection unit and a three-dimensional detection unit, and the detection module predetermines the optical-axis ray.

11. The computer system of claim 9, wherein the command object is a closest object to the detection module and is realized a finger or a palm of the user.

12. The computer system of claim 9, wherein the step of transforming the face coordinate into the transformed face coordinate according to the coordinate of the detection module further comprises:
utilizing a first matrix to process a rotational operation for the face coordinate according to a camera focus length, to form the transformed face coordinate;

wherein the first matrix is realized as $$\begin{bmatrix} f & 0 & 0 \\ 0 & f & 0 \\ 0 & 0 & 1 \end{bmatrix}$$

and the symbol f is the camera focus length.

13. The computer system of claim 9, wherein the step of obtaining the transformed command object coordinate according to the angle and the command object coordinate further comprises:
    utilizing the coordinate of the detection module as a corrected universal origin to set up a corrected universal coordinate system comprising a corrected universal X-axis, a corrected universal Y-axis and a corrected universal Z-axis, so as to determine a reference angle between the angle as well as the corrected universal X-axis, the corrected universal Y-axis and the corrected universal Z-axis; and
    obtaining the transformed command object coordinate according to the reference angle.

14. The computer system of claim 13, wherein the step of obtaining the transformed command object coordinate according to the reference angle further comprises:
    utilizing a second matrix to process a rotational operation for the command object coordinate to obtain the transformed command object coordinate;
    wherein when the reference angle between the angle and the corrected universal X-axis is ω, the second matrix is realized as $$\begin{bmatrix} 1 & 0 & 0 \\ 0 & \cos\omega & \sin\omega \\ 0 & -\sin\omega & -\cos\omega \end{bmatrix};$$

when the reference angle between the angle and the corrected universal Y-axis is φ, the second matrix is realized as $$\begin{bmatrix} \cos\phi & 0 & -\sin\phi \\ 0 & 1 & 0 \\ \sin\phi & 0 & \cos\phi \end{bmatrix};$$

and when the reference angle between the angle and the corrected universal Z-axis is κ, the second matrix is realized as $$\begin{bmatrix} \cos\kappa & \sin\kappa & 0 \\ -\sin\kappa & \cos\kappa & 0 \\ 0 & 0 & 1 \end{bmatrix}.$$

15. The computer system of claim 9, wherein the step of determining the depth change of the command object according to the transformed command object coordinate to set up the interactive operation between the interactive system and the user further comprises:
    obtaining a plurality of transformed command object coordinates and a plurality of command object Z-axis coordinates thereof at a plurality of periods; and
    calculating differences between two of the plurality of command object Z-axis coordinates to be the depth change, so as to set up the interactive operation between the interactive system and the user.

16. The computer system of claim 9, wherein the interactive operation predetermines a plurality of command operations corresponding to different depth changes, such that the user operates the interactive system according to the depth change of the command object.

* * * * *